US011808213B2

(12) United States Patent
Mouly et al.

(10) Patent No.: US 11,808,213 B2
(45) Date of Patent: Nov. 7, 2023

(54) MECHANICAL REDUCER

(71) Applicant: SAFRAN TRANSMISSION SYSTEMS, Colombes (FR)

(72) Inventors: Guillaume Pierre Mouly, Moissy-Cramayel (FR); Frédéric Nicolas François Laisnez, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/582,546

(22) Filed: Jan. 24, 2022

(65) Prior Publication Data

US 2022/0243662 A1 Aug. 4, 2022

(30) Foreign Application Priority Data

Feb. 3, 2021 (FR) ...................... 2101036

(51) Int. Cl.
*F16H 57/04* (2010.01)
*F02C 7/36* (2006.01)
(Continued)

(52) U.S. Cl.
CPC .................. *F02C 7/36* (2013.01); *F02C 7/06* (2013.01); *F16H 1/28* (2013.01); *F16H 57/0421* (2013.01); *F16H 57/0486* (2013.01); *F05D 2220/323* (2013.01); *F05D 2260/40311* (2013.01); *F05D 2260/98* (2013.01)

(58) Field of Classification Search
CPC .......... F02C 7/36; F16H 1/28; F16H 57/0486; F05D 2220/323
See application file for complete search history.

(56) References Cited

U.S. PATENT DOCUMENTS

2015/0139802 A1 5/2015 Curlier et al.
2017/0307061 A1* 10/2017 Gravina .............. F16H 57/0424
(Continued)

FOREIGN PATENT DOCUMENTS

EP 3 696 449 A1 8/2020

OTHER PUBLICATIONS

French Search Report, issued in Priority Application No. 2101036, dated Sep. 15, 2021.

*Primary Examiner* — Derek D Knight
(74) *Attorney, Agent, or Firm* — Birch, Stewart, Kolasch & Birch, LLP

(57) ABSTRACT

The present invention relates to a mechanical reducer (6) for a turbomachine, in particular an aircraft, this reducer (6) including:
a sun gear extending around an axis (61) of rotation,
a crown which extends around the sun gear and which is configured to be fixed in rotation around said axis (61),
planet gears which are meshed with the sun gear and the crown and which are held by a planet carrier (62) which is configured to be movable in rotation about said axis (61), In addition, the oil distributor (65) comprises a plurality of oil distribution modules (67) assembled together, each module (67) comprising at least one lubrication pipe (68) having an inlet intended to receive oil and an outlet (69) adapted to lead the oil into an opening (63) of the planet carrier (62), the opening (63) being intended for lubricating the reducer.

9 Claims, 7 Drawing Sheets

(51) Int. Cl.
*F02C 7/06* (2006.01)
*F16H 1/28* (2006.01)

(56) References Cited

U.S. PATENT DOCUMENTS

| | | |
|---|---|---|
| 2020/0096089 A1 | 3/2020 | Hashimoto et al. |
| 2020/0132186 A1* | 4/2020 | Dombek ............. F16H 57/0486 |
| 2020/0191258 A1 | 6/2020 | Di Giovanni |
| 2020/0208577 A1 | 7/2020 | Di Giovanni et al. |
| 2020/0300173 A1* | 9/2020 | Simon ................. F16H 57/0482 |
| 2021/0116017 A1* | 4/2021 | Charrier ............. F16H 57/0479 |

* cited by examiner

MECHANICAL REDUCER

FIELD OF THE INVENTION

The present invention relates to the field of mechanical reducers for turbomachines, in particular aircraft turbomachines.

STATE OF THE ART

In a known manner, the role of a mechanical reducer is to change the speed and torque ratio between the input axis and the output axis of a mechanical system.

Newer generations of bypass turbomachines, in particular those with a high dilution rate, include a mechanical reducer to drive the shaft of a fan. Usually, the purpose of the reducer is to transform the speed of rotation called fast speed of rotation of the shaft of a power turbine into a slower speed of rotation for the shaft driving the fan.

Such a reducer comprises a central pinion, called sun gear, a crown and pinions called planet gears, which are engaged between the sun gear and the crown. The planet gears are held by a frame called a planet carrier. The sun gear, the crown and the planet carrier are planetary wheels because their axes of revolution coincide with the longitudinal axis X of the turbomachine. The planet gears each have a different axis of revolution evenly distributed on the same operating diameter around the axis of the planetary wheels. These axes are parallel to the longitudinal axis X.

There are several architectures of reducer. In the state of the art of bypass turbomachines, the reducers are of the planetary or epicyclic type. In other similar applications, there are architectures called differential or compound architectures.

On a planetary reducer, the planet carrier is stationary and the crown constitutes the output shaft of the device which rotates in the direction opposite to the sun gear.

On an epicyclic reducer, the crown is stationary and the planet carrier constitutes the output shaft of the device which rotates in the same direction as the sun gear.

On a differential reducer, no element is fixed in rotation. The crown rotates in the direction opposite to the sun gear and the planet carrier.

Reducers can consist of one or more meshing stages. This meshing is ensured in different ways such as by contact, by friction or else by magnetic fields.

There are several types of contact meshing such as straight, helical or chevron teeth.

Reducers need oil to lubricate and cool gears, splines, rollers, and bearings. In the event that the planet carrier is rotating, the oil at the bearings of the planet gears or the gear meshes must be applied in a rotating field. There is therefore a need to transfer the oil from the reservoir located on a stator part to the rotating planet carrier. This transfer is commonly carried out through an OTB (Oil Transfer Bearing)

The present invention proposes a simple, efficient and economical improvement of this technology.

DISCLOSURE OF THE INVENTION

According to a first aspect, the invention proposes a mechanical reducer for a turbomachine, in particular an aircraft, this reducer including:
a sun gear having an axis of rotation,
a crown which extends around the sun gear and which is configured to be fixed in rotation around said axis,
planet gears which are meshed with the sun gear and the crown and which are held by a planet carrier which is configured to be movable in rotation about said axis (61),
a lubricating oil distributor.

In addition, the oil distributor comprises a plurality of separate oil distribution modules, said modules being assembled outside the planet carrier so as to form together a distributor 65, each module comprising at least one lubricating pipe having an inlet intended to receive oil and an outlet adapted to lead the oil into an opening of the planet carrier, the opening being intended for the lubrication of the reducer.

In a particularly advantageous manner, the distributor according to the invention allows oil to be supplied to a rotating field. The modular structure of the distributor allows this contribution to have little impact on the structure while being easy to mount.

Each module can comprise a plurality of pipes.

Several pipes of the same module may have different diameters.

Several pipes of the same module may have at least two different orientations.

The planet carrier may have a plurality of evenly distributed openings.

The planet carrier comprises a number of openings defined by n times the number of planet gears.

The distributor can be held between the planet carrier and a nut.

The outlet of each pipe may comprise sealing means, the sealing means comprising at least one O-ring seal allowing to ensure the sealing of a connection of the outlet with each corresponding opening.

The sealing means may comprise a combination of two O-ring seals and a radial labyrinth or a coil comprising a double O-ring seal and a hoop.

According to another aspect, the invention relates to a method for assembling a reducer according to the invention. The method comprises at least the following steps:
positioning of the nut on the axis;
introducing the distal ends into the corresponding openings of the planet carrier;
rotating each module to assemble them to each other between the planet carrier and the nut;
tightening the nut.

DESCRIPTION OF THE FIGURES

Other features, purposes and advantages of the invention will emerge from the following description, which is purely illustrative and not limiting, and which should be read with reference to the appended drawing in which.

DETAILED DESCRIPTION OF THE INVENTION

Turbomachine

Figure 1:
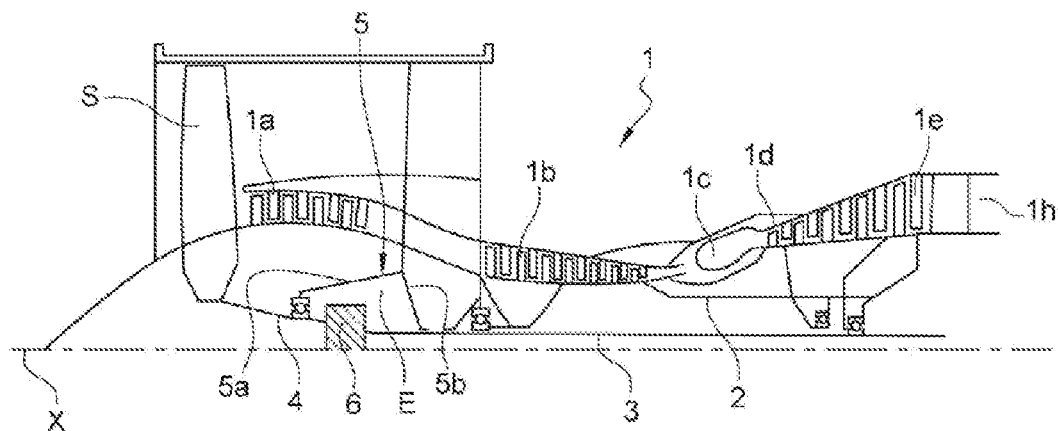
FIG. 1 is a schematic axial sectional view of a turbomachine using the invention.

FIG. 1 describes a turbomachine 1 which conventionally includes a fan S, a low pressure compressor 1a, a high pressure compressor 1b, an annular combustion chamber 1c, a high pressure turbine 1d, a low pressure turbine 1e and an exhaust nozzle 1h. The high pressure compressor 1b and the high pressure turbine 1d are connected by a high pressure shaft 2 and form therewith a high pressure body (HP). The low pressure compressor 1a and the low pressure turbine 1e are connected by a low pressure shaft 3 and form therewith a low pressure body (LP).

The fan S is driven by a fan shaft 4 which is driven to the shaft LP 3 by means of a reducer 6. This reducer 6 is generally of the planetary or epicyclic type.

Reducer

Figure 2:
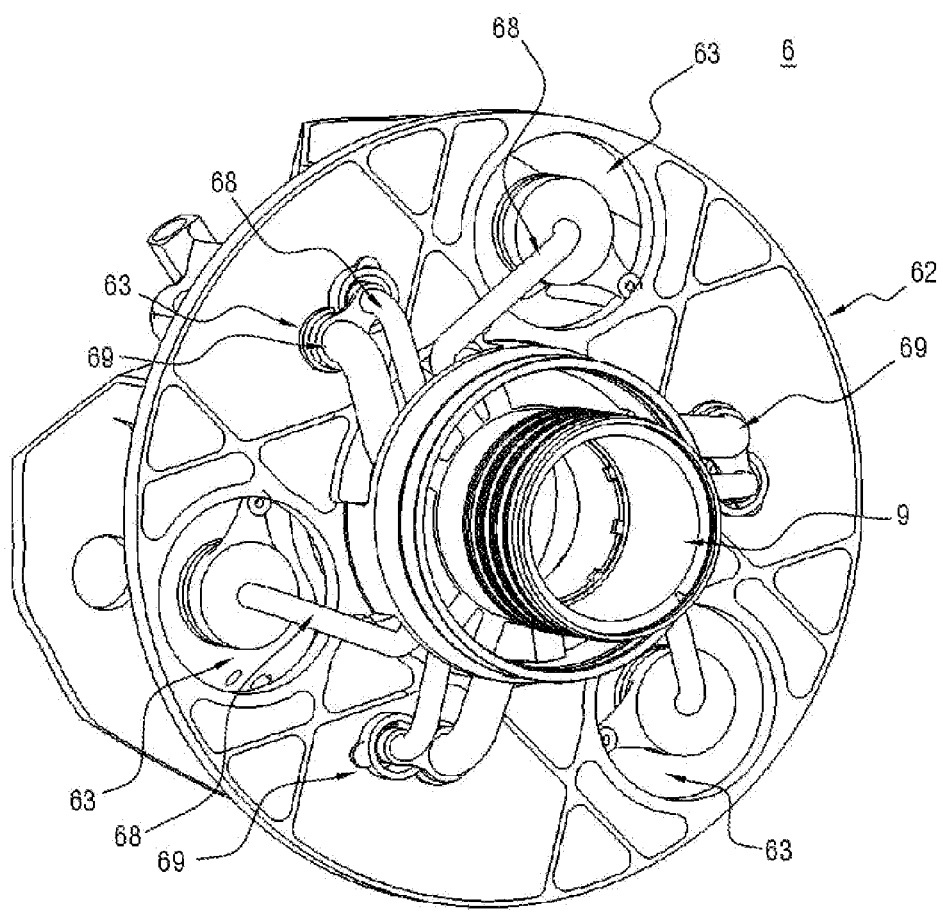
FIG. 2 is a perspective representation of a reducer according to the invention.

With reference to FIG. 2, the reducer 6 includes:
a sun gear having an axis 61 of rotation,
a crown which extends around the sun gear and which is configured to be fixed in rotation around said axis 61,
planet gears which are meshed with the sun gear and the crown and which are held by a planet carrier 62 which is configured to be movable in rotation about said axis 62,
a lubricating oil distributor 65, Furthermore, the oil distributor 65 comprises a plurality of oil distribution modules 67 assembled together, each module 67 comprising at least one lubrication pipe 68 having an inlet intended to receive oil and an outlet 69 adapted to lead the oil into an opening 63 of the planet carrier 62, the opening 63 being intended for lubricating the reducer.

In a particularly advantageous manner, the distributor according to the invention allows oil to be supplied to a rotating field. The modular structure of the distributor allows this contribution to have little impact on the structure while being easy to mount.

Preferably, the planet carrier 62 has a plurality of evenly distributed openings 63. Preferably, the planet carrier 62 comprises a number of openings defined by n times the number of planet gears.

According to a preferred arrangement, the planet carrier 62 is made in one piece.

Distributor

The distributor 65 allows to ensure a fluidic connection between an OTB 9 and the planet carrier 62. In other words, the distributor 65 allows oil transfer from the OTB 9 to the planet carrier 62.

As indicated previously, the distributor 65 comprises a plurality of modules 67 assembled together. In other words, the distributor 65 is a kit of several separate modules 67 which are assembled together to form a distributor 65.

Figure 3:
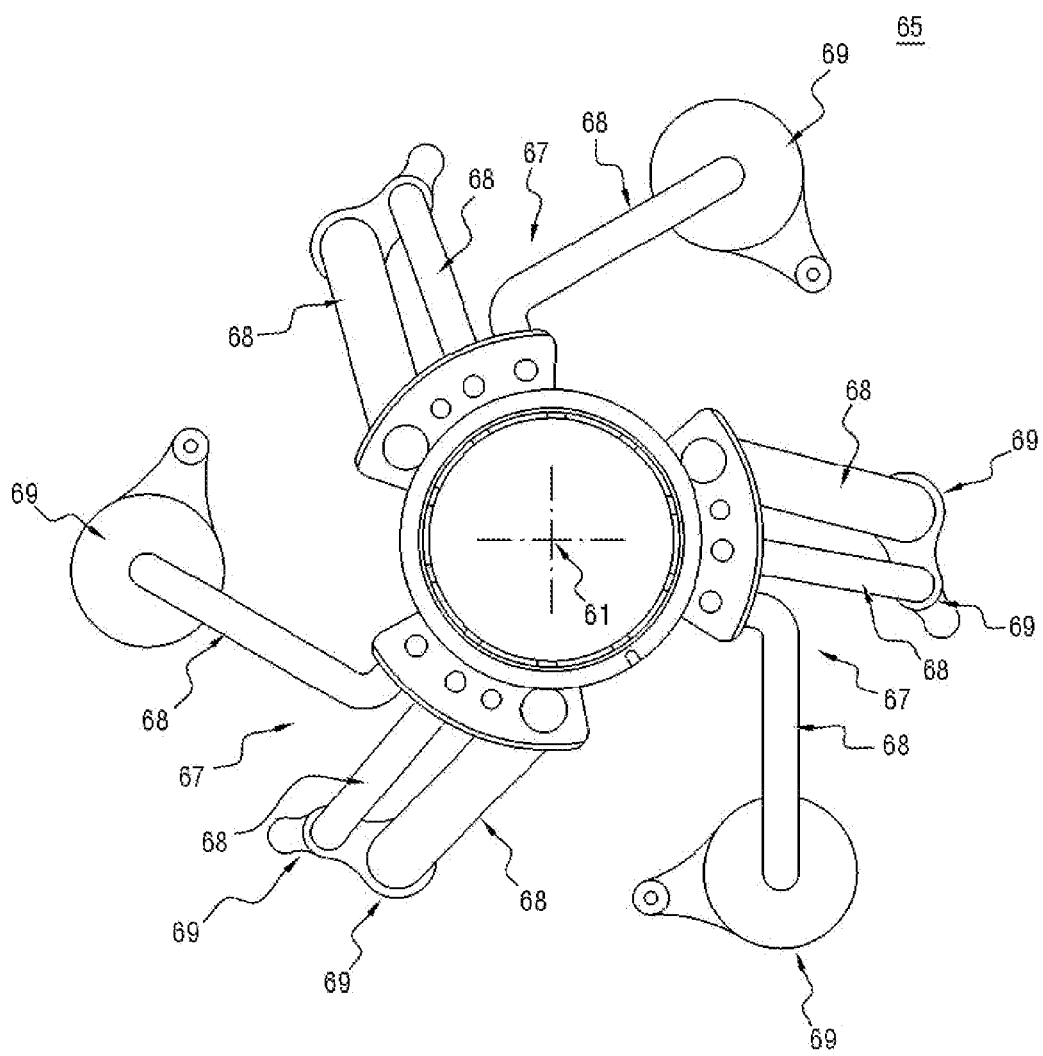
FIG. 3 is a representation of a distributer according to the invention.
Figure 4:
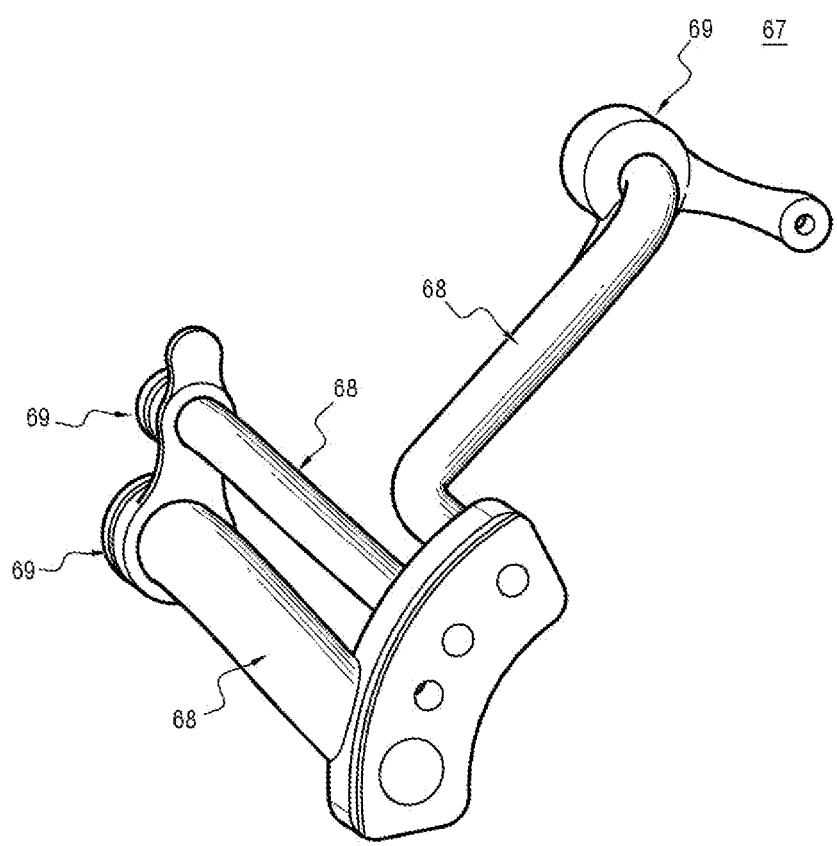
FIG. 4 is a perspective representation of a module of a distributer according to the invention.

Each module 67 comprises at least one pipe 68 allowing to introduce oil into the planet carrier 62. As shown in the figures, each module 67 may have several pipes 68. As shown in FIGS. 3 and 4, the different pipes 68 of the same module 67 can have different orientations. Likewise, the pipes 68 of the same module 67 may have different diameters. Typically, the diameter of a line 68 can be dictated by the amount and pressure of the oil that must pass therethrough.

As indicated above, each pipe 68 has an outlet 69 which is intended to be introduced into a corresponding opening 63 of the planet carrier. The outlet 69 may comprise sealing means, the sealing means comprising at least one O-ring seal 72 allowing to ensure the sealing of a connection of the outlet 69 with the opening 63.

Figure 5:
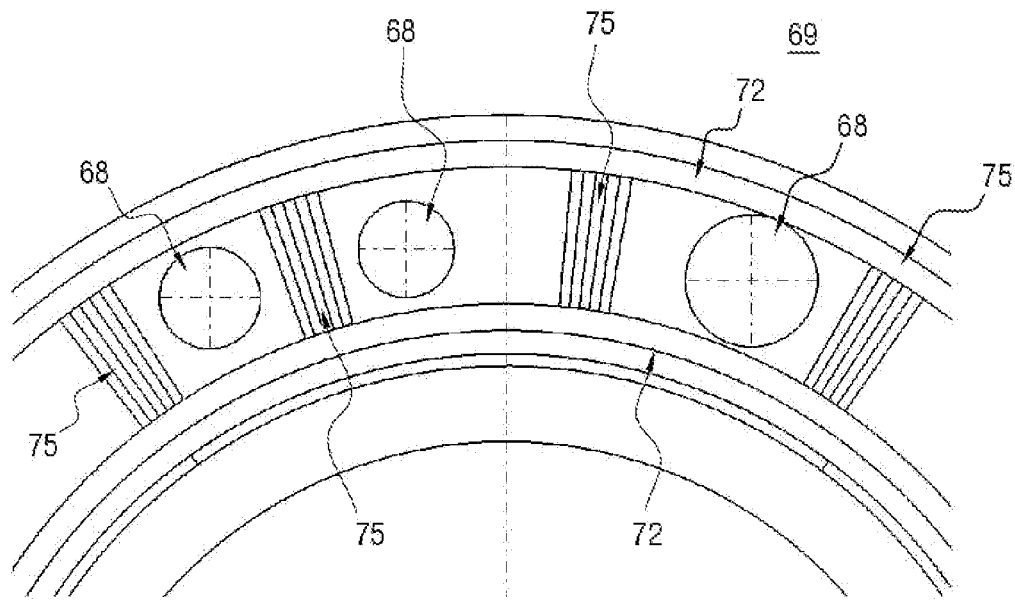
FIG. 5 is a representation of an outlet of a pipe of a distributor according to one embodiment of the invention.
Figure 6:
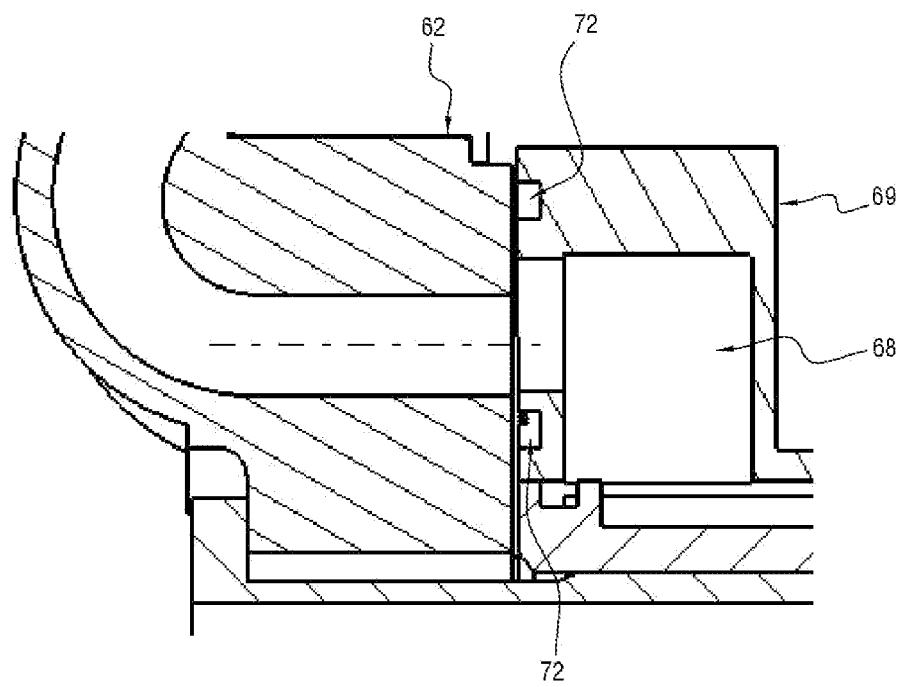
FIG. 6 is a representation of an outlet of a pipe of a distributor according to one embodiment of the invention.

According to another embodiment, shown in FIGS. 5 and 6, the sealing means may comprise a combination of two O-ring seals 72 and of a radial labyrinth 75. The O-ring seals 72 allow to guarantee a sealing between the outlet 69 and the outside. The labyrinths 75 ensure a sealing between the various pipes 68.

Figure 7:
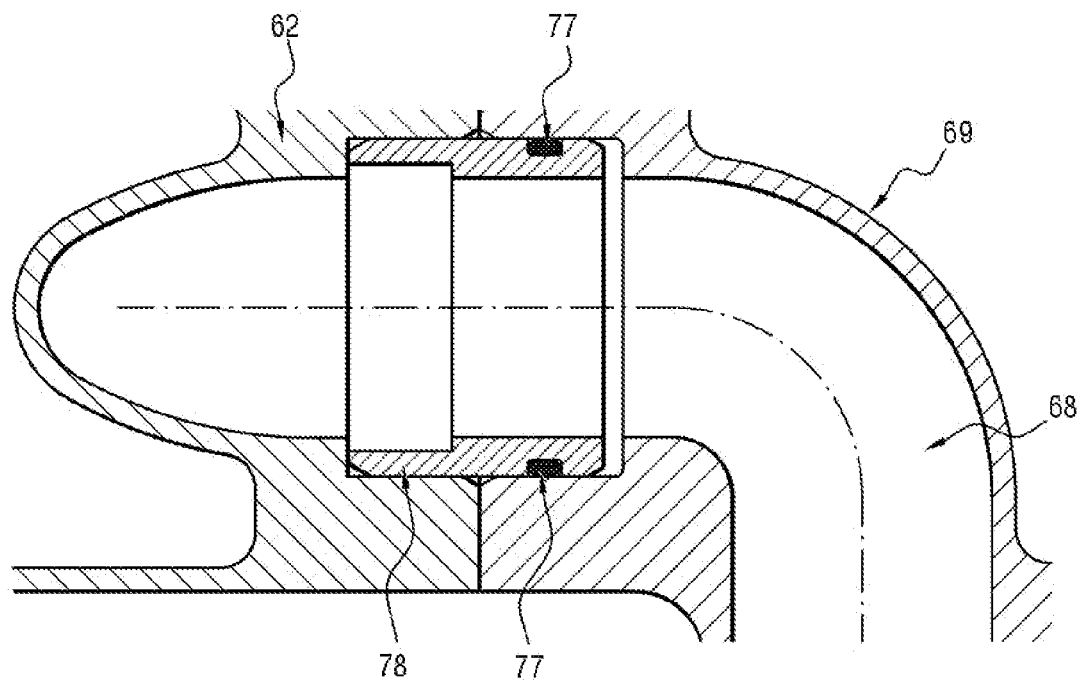
FIG. 7 is a representation of an outlet of a pipe of a distributor according to one embodiment of the invention.

According to another embodiment, shown in FIG. 7, the outlet 69 may have a combination of two O-ring seals 72 and a radial labyrinth 75 or a coil 76 comprising a double O-ring seal 77 and a hoop 78. It is specified that the coil 76 can be a portion of a cylinder embedded in the outlet 69 and sealingly connected to the outlet 69 by virtue of the double O-ring seal 77. The coil is shrunk in the opening 63, the shrinking also allowing to guarantee the tightness of the connection. This arrangement allows to combine sealing and mechanical strength. The shrinking is a particularly advantageous arrangement because this connection requires few mechanical means while being sufficiently robust. Indeed, as indicated above, the distributor 65 exerts very little force on the planet carrier 62. In this context, the shrinking is therefore a sufficient and particularly adapted connecting solution.

In addition, the different modules 67 can be assembled to each other by bolts.

Preferably, the distributor 65 is held between the planet carrier 62 and a nut 79.

This solution allows to completely differentiate the structural part from the oil circuit part and thus give free rein to the choice of materials, manufacturing method and geometry, without adding additional axial bulk. Typically, the modules of the distributor 65 can be produced by additive manufacturing.

Assembly Method

According to another aspect, the invention provides a method for assembling a reducer 6 according to the invention.

The method can comprise at least the following steps:
positioning the nut 79 on the axis 61;
introducing the distal ends 69 into the corresponding openings of the planet carrier 62;
rotating each module 67 to assemble them to each other between the planet carrier 62 and the nut 79;
tightening the nut 79.

Figure 8:
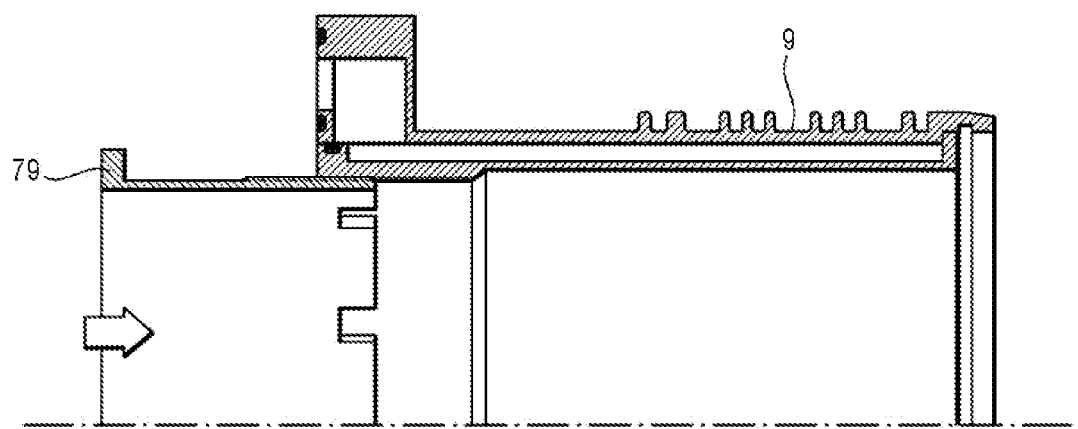
FIG. 8 is a schematic representation of a step of assembling a reducer according to the invention.

More specifically, with reference to FIG. 8, the nut 79 is first screwed onto the OTB 9.

Figure 9:
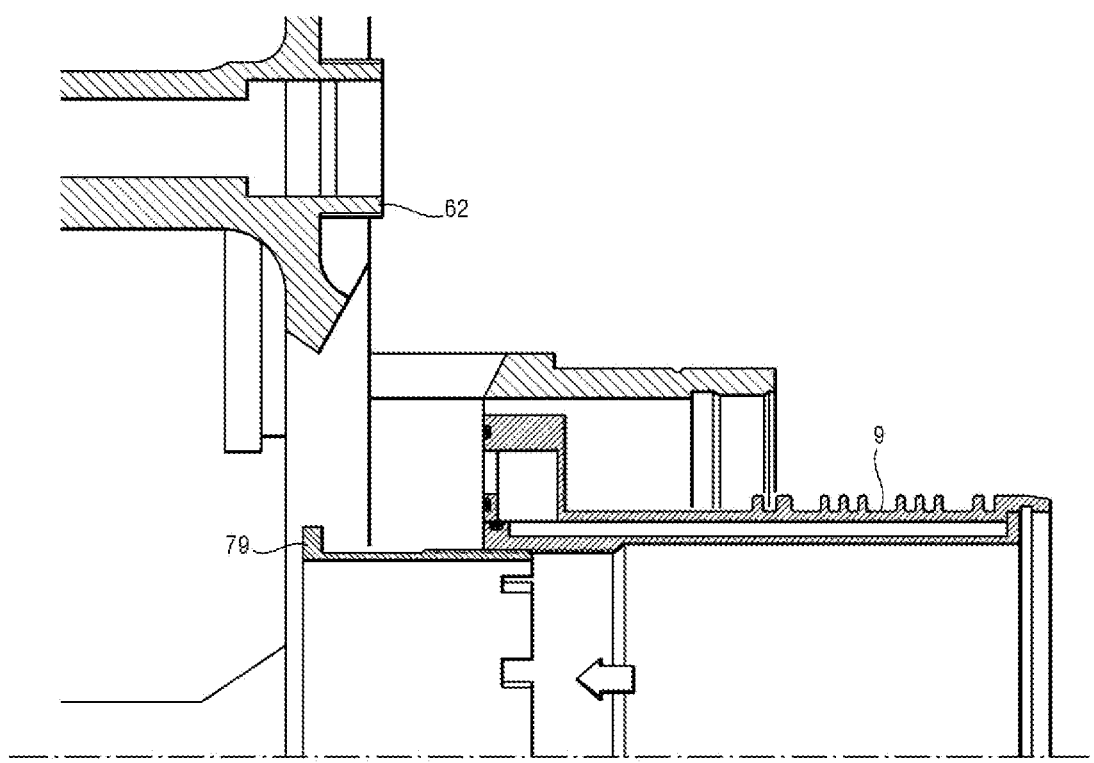
FIG. 9 is a schematic representation of a step of assembling a reducer according to the invention.

Then, as shown in FIG. 9, the nut 79 and OTB 9 assembly is engaged against the planet carrier 62.

Figure 10:
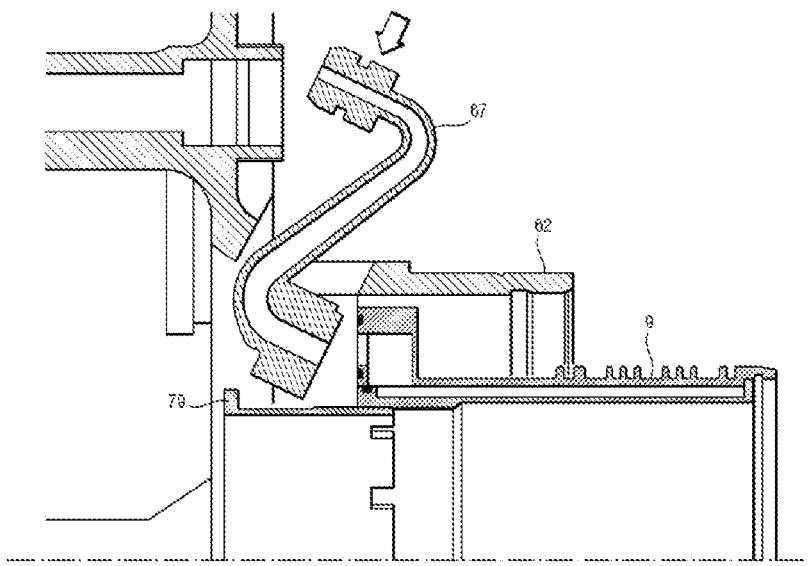
FIG. 10 is a schematic representation of a step of assembling a reducer according to the invention.

Each module 67 is then engaged in the planet carrier 62. As shown in FIG. 10, each module is engaged inclined (that is to say in a direction intersecting the axial and radial directions).

Figure 11:
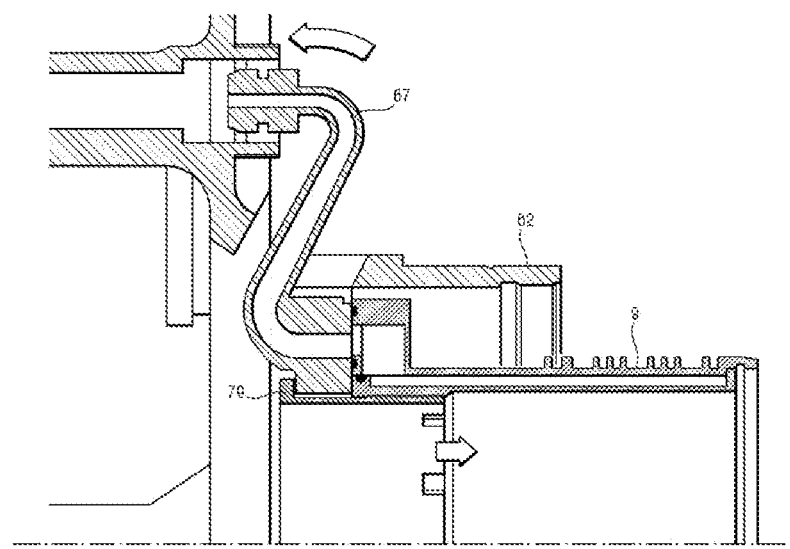
FIG. 11 is a schematic representation of a step of assembling a reducer according to the invention.

Then, with reference to FIG. 11, each module is folded down so that the outlet 69 is engaged in an opening 63, and that the fluidic connection between the OTB 9 and the planet carrier 62 is ensured.

Finally, the nut 79 is tightened to ensure that the modules 67 are held.

The modules 67 can also be bolted to each other.

It is therefore understood that the modular structure of the distributor 65 allows simple assembly, which does not require dismounting the planet carrier 62.

The invention claimed is:

1. A mechanical reducer for a turbomachine, including:
   a sun gear extending around an axis of rotation,
   a crown which extends around the sun gear and which is configured to be fixed in rotation around said axis of rotation,
   planet gears which are meshed with the sun gear and the crown and which are held by a planet carrier which is configured to be movable in rotation about said axis of rotation,
   a lubricating oil distributor,
   wherein the lubricating oil distributor comprises a plurality of separate oil distribution modules, each oil distribution module comprising a plurality of pipes, said oil distribution modules being assembled outside the planet carrier so as to form together the lubricating oil distributor, each oil distribution module comprising at least one lubrication pipe having an inlet adapted to receive oil and an outlet adapted to lead the oil into at least one opening of the planet carrier, the at least one opening being configured for lubricating the reducer.

2. The reducer according to claim 1, wherein several pipes of a same oil distribution module have different diameters.

3. The reducer according to claim 1, wherein several pipes of a same oil distribution module have at least two different orientations.

4. The reducer according to claim 1, wherein the planet carrier has a plurality of evenly distributed openings.

5. The reducer according to claim 4, wherein the planet carrier comprises a number of openings defined by n times the number of planet gears, n being an integer number.

6. The reducer according to claim 1, wherein the outlet of each lubrication pipe comprises a sealing arrangement, the sealing arrangement comprising at least one O-ring seal configured to seal a connection of the outlet with each corresponding opening.

7. The reducer according to claim 6, wherein the sealing arrangement comprises a combination of two O-ring seals and a radial labyrinth or a coil comprising a double O-ring seal and a hoop.

8. The reducer according to claim 1, wherein the distributor is held between the planet carrier and a nut.

9. A method for assembling a reducer according to claim 8, the method comprising at least the following steps:
   positioning the nut on the axis of rotation;
   introducing the outlets of the lubrication pipes into the corresponding openings of the planet carrier;
   rotating each oil distribution module to assemble each oil distribution module to another one between the planet carrier and the nut;
   tightening the nut.

* * * * *